(12) United States Patent
Liang et al.

(10) Patent No.: US 8,391,407 B2
(45) Date of Patent: Mar. 5, 2013

(54) DATA TRANSMISSION DEVICE AND METHOD THEREOF, AND DATA RECEPTION DEVICE AND METHOD THEREOF

(75) Inventors: Shengbao Liang, Beijing (CN); Hua Zhou, Beijing (CN); Jie Zhang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/156,056

(22) Filed: Jun. 8, 2011

(65) Prior Publication Data

US 2011/0235751 A1 Sep. 29, 2011

Related U.S. Application Data

(63) Continuation of application No. PCT/CN2010/070196, filed on Jan. 15, 2010.

(30) Foreign Application Priority Data

Mar. 11, 2009 (CN) .......................... 2009 1 0118193

(51) Int. Cl.
 *H04L 27/36* (2006.01)
 *H04L 5/12* (2006.01)
 *H04L 23/02* (2006.01)

(52) U.S. Cl. ...................................... 375/298; 375/264

(58) Field of Classification Search .................. 375/264, 375/265, 295, 298, 267
 See application file for complete search history.

(56) References Cited

U.S. PATENT DOCUMENTS

| 2003/0081690 | A1* | 5/2003 | Kim et al. ..................... 375/264 |
| 2006/0120482 | A1 | 6/2006 | Park et al. |
| 2008/0260067 | A1 | 10/2008 | Wengerter et al. |
| 2008/0279303 | A1* | 11/2008 | Wengerter et al. ............ 375/295 |

FOREIGN PATENT DOCUMENTS

| CN | 1823511 | 8/2006 |
| CN | 101232352 | 7/2008 |

OTHER PUBLICATIONS

TSG-RAN Working Group 1 Meeting #20, Improved double-STTD Schemes Using Asymmetric Modulation and Antenna Shuffling, May 2001, texas Instruments.*
International Search Report issued for corresponding International Patent Application No. PCT/CN2010/070196, mailed Apr. 15, 2010.
3GPP TS 36.212 V8.4.0 (Sep. 2008); 3rd Generation Partnership Project; Technical Specification Group Radio Access Network; Evolved Universal Terrestrial Radio Access (E-UTRA); Multiplexing and channel coding (Release 8); Sep. 2008.
Notification of the First Office Action issued for corresponding Chinese Patent Application No. 200910118193.X, issued Aug. 22, 2012, with English translation.
Texas Instruments; "Improved Double-STTD schemes using asymmetric modulation and antenna shuffling"; Agenda Item: AH24: HSDPA; TSGR1#20(01)-04; TSG-RAN Working Group 1 meeting #20; Busan, Korea; May 21-24, 2001.

* cited by examiner

*Primary Examiner* — David C. Payne
*Assistant Examiner* — Wednel Cadeau
(74) *Attorney, Agent, or Firm* — Myers Wolin, LLC

(57) ABSTRACT

The present invention discloses a data transmission device and method thereof, and a data reception device and method thereof. The data transmission method in the present invention includes the following steps: encoding information data to obtain mother codes; generating transmission data including the mother codes and repetition codes from the mother codes, wherein parts of the mother codes with low reliability are selected to be repetition codes according to the modulation type of the mother codes; modulating the transmission data; transmitting the modulated data.

18 Claims, 11 Drawing Sheets

DATA TRANSMISSION DEVICE AND METHOD THEREOF, AND DATA RECEPTION DEVICE AND METHOD THEREOF

CROSS-REFERENCE TO RELATED APPLICATIONS

This is a continuation of Application PCT/CN2010/070196, filed on Jan. 15, 2010, which claims priority to Chinese Patent Application No. 200910118193.X, filed on Mar. 11, 2009, now pending, the contents of which are herein wholly incorporated by reference.

FIELD OF THE INVENTION

The present invention generally relates to the field of communications and in particular to a data transmission apparatus and method thereof using encoding and modulation and a data reception apparatus and method thereof using demodulation and decoding.

BACKGROUND OF THE INVENTION

In a traditional communication system using encoding and modulation, output data of an encoding module typically results from puncturing or repeating a mother code. If a required code rate is lower than a rate of the mother code, then it is typically repeated. On the contrary, if the required code rate is higher than the rate of the mother code, then it is typically punctured.

FIG. 1 illustrates a schematic diagram of an encoding module using puncturing and/or repetition. In FIG. 1, information is encoded by the encoding module to obtain a mother code at a code rate of 1/3. The mother code is composed of information data and parity data. In the example of FIG. 1, the parity data is composed of parity data 1 and parity data 2. As illustrated in FIG. 1, the last four bits are a repetition of the first four bits and referred to a repetition code in the case of using repetition and requiring a code rate of 1/4. In this case of repetition, the mother code and the repetition code serve together as transmission data. Only the first eight bits of data of the mother code is transmitted in the case of using puncturing and requiring a code rate of 1/2.

As can be apparent from currently published articles and patents, a majority of solutions concern a design of a puncturing pattern for the approach of puncturing. For the approach of repeating, a typical solution is to select data of a mother code as a repetition code through loop buffering and then modulate output data of an encoding module in a preselected modulation scheme. These methods can be found in, for example, "3GPP TS 36.212 v8.4.0 (2008-09)-3rd Generation Partnership Project; Technical Specification Group Radio Access Network; Evolved Universal Terrestrial Radio Access (E-UTRA); Multiplexing and channel coding (Release 8)" and U.S. patent application Publication No. US2008260067A1, by Christian Wengerter et al, entitled "Bit Reliability Equalization By Modulation Switching For HARQ". The contents of these documents are incorporated here by reference.

However, an improved data transmission method and apparatus is still desired at present to reduce the complexity of demodulation at a receiver while improving the performance of reception at a communication system.

SUMMARY OF THE INVENTION

The Summary of the invention will be given below to provide basic understanding of some aspects of the invention. It shall be appreciated that this Summary is neither exhaustively descriptive of the invention nor intended to define essential or important components or the scope of the invention but is merely for the purpose of presenting some concepts in a simplified form and hereby acts as a preamble of more detailed descriptions which will be presented later.

An object of the invention is to propose a simple data transmission apparatus and method thereof and a corresponding data reception apparatus and method thereof for an encoding block in which the approach of repeating is used. The apparatuses and methods according to the invention can be used to reduce the complexity of demodulation at a receiver while improving the performance of reception at a communication system.

According to an aspect of the invention, there is provided a data transmission method including: encoding information data to obtain a mother code; generating transmission data including the mother code and a repetition code, wherein the repetition code is selected from a part of the mother code having low reliability based on a modulation scheme of the mother code; modulating the transmission data; and transmitting the modulated data.

According to another aspect of the invention, there is provided a data transmission apparatus including: an encoder configured to encode information data to obtain a mother code; a data selector configured to generate transmission data including the mother code and a repetition code, wherein the repetition code is selected from a part of the mother code having low reliability based on a modulation scheme of the mother code; a modulator configured to modulating the transmission data; and a transmitter configured to transmit the modulated data.

The modulation scheme is QPSK, 16QAM, 64QAM or a higher-order modulation scheme or another bit reliability-variable modulation scheme.

In the data transmission method and/or apparatus according to an embodiment of the invention, the mother code includes an information data portion and a parity data portion; the repetition code includes at least a part of or all of data having low reliability in the information data portion; and the mother code and the repetition code are modulated by using a same modulation scheme.

Preferably, data having low reliability in the information data portion is selected as data having high reliability in the repetition code at the time of modulating; and data having low reliability in the parity data portion is selected as data having low reliability in the repetition code at the time of modulating.

In the data transmission method and/or apparatus according to an embodiment of the invention, the mother code includes an information data portion and a parity data portion; the repetition code includes at least a part of or all of data having low reliability in the information data portion; and the mother code in the transmission data is modulated by using a first modulating scheme, and the repetition code in the transmission data is modulated by using a second modulating scheme with an order lower than the order of the first modulating scheme.

When the first modulation scheme is 16QAM and the second modulation scheme is QPSK, two bits having low reliability of the mother code mapped into a 16QAM symbol are selected as the repetition code.

When the first modulation scheme is 64QAM and the second modulation scheme is QPSK, two bits having low reliability of the mother code mapped into a 64QAM symbol are selected as the repetition code.

When the first modulating scheme is 64QAM and the second modulation scheme is 16QAM, four bits having low reliability of the mother code mapped into a 64QAM symbol are selected as the repetition code.

Preferably, among the four bits selected, two bits having the lowest reliability are mapped into positions having high reliability in the 16QAM symbol, and two bits having lower reliability are mapped into positions having low reliability in the 16QAM symbol.

According to another aspect of the invention, there is provided a data reception method including: receiving modulated data; demodulating the modulated data to generate a mother code and a repetition code, wherein the repetition code is a part of the mother code having low reliability that is selected based on a modulation scheme of the mother code; correcting the mother code based on the demodulated mother code and repetition code; and decoding the corrected mother code.

According to another aspect of the invention, there is provided a data reception apparatus including: a receiver configured to receive modulated data; a modulator configured to demodulate the modulated data to generate a mother code and a repetition code, wherein the repetition code is a part of the mother code having low reliability that is selected based on a modulation scheme of the mother code; a corrector configured to correct the mother code based on the demodulated mother code and repetition code; and a decoder configured to decode the corrected mother code.

The modulation scheme is QPSK, 16QAM, 64QAM or a higher-order modulation scheme or another bit reliability-variable modulation scheme.

In the data reception method and/or apparatus according to an embodiment of the invention, modulation schemes of the mother code and the repetition code in the modulated data received are the same; the mother code includes an information data portion and a parity data portion; and the repetition code includes at least a part of or all of data having low reliability in the information data portion.

Preferably, data having high reliability in the repetition code are selected from data having low reliability in the information data portion; and data having low reliability in the repetition code are selected from data having low reliability in the parity data portion.

In the data reception method and/or apparatus according to an embodiment of the invention, the mother code in the modulated data received is modulated by using a first modulating scheme, and the repetition code in the modulated data received is modulated by using a second modulating scheme with an order lower than the order of the first modulating scheme; the mother code includes an information data portion and a parity data portion; and the repetition code includes at least a part of or all of data having low reliability in the information data portion.

Furthermore, according to another aspect of the invention, there is further provided a corresponding computer readable storage medium and computer program product.

An advantage of the invention lies in that in the data transmission method/apparatus and the data reception method and/or apparatus according to the embodiments of the invention, the part of the mother code with low reliability is selected as the repetition code together with the mother code to compose the transmission data, and the transmission data is modulated and then transmitted. Thus, the part of the mother code with low reliability is selected as the repetition code, thereby improving the reliability and consequently the reliability of a communication system.

BRIEF DESCRIPTION OF THE DRAWINGS

The invention can be better understood with reference to the description given below in conjunction with the accompanying drawings, throughout which identical or like reference signs denote identical or like components and together with which the following detailed description is incorporated into and forms a part of the specification and serves to further illustrate the preferred embodiments of the invention and to explain the principle and advantages of the invention. In the drawings:

FIG. 4 illustrates a constellation diagram of 64-ary Quadrature Amplitude Modulation (64QAM);

DETAILED DESCRIPTION OF THE INVENTION

Figure 1:
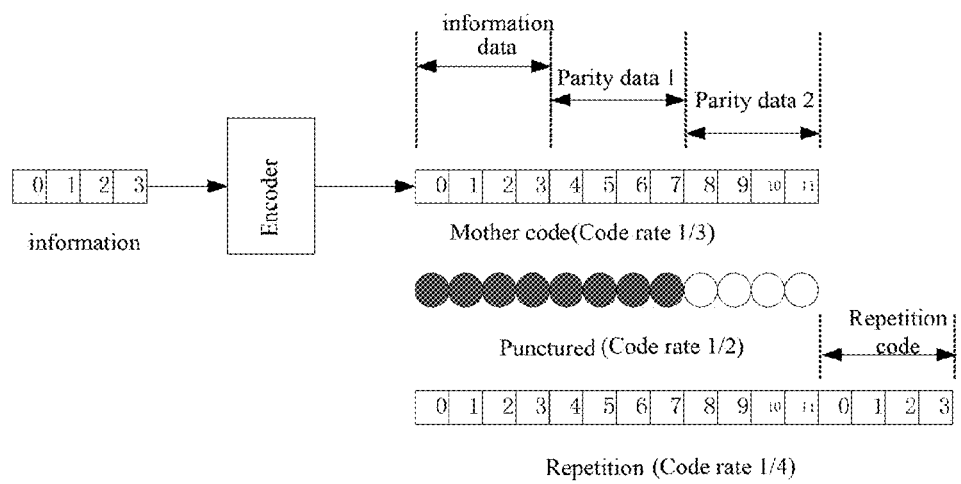
FIG. 1 illustrates a schematic diagram of an encoding module using puncturing and repetition.

Exemplary embodiments of the present invention will be described below in conjunction with the accompanying drawings. For the sake of clarity and conciseness, not all the features of practical implementations have been described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the invention are illustrated in the drawings while other details less relevant to the invention are omitted so as not to obscure the invention due to those unnecessary details.

An object of the invention is to provide a simple data transmission apparatus and method thereof and a corresponding data reception apparatus and method thereof for an encoding block in which the approach of repeating is used. Therefore, in the embodiments of the invention, a mother code and a repetition code will also be involved, the mother code will also include two portions of information data and parity data.

Figure 2:
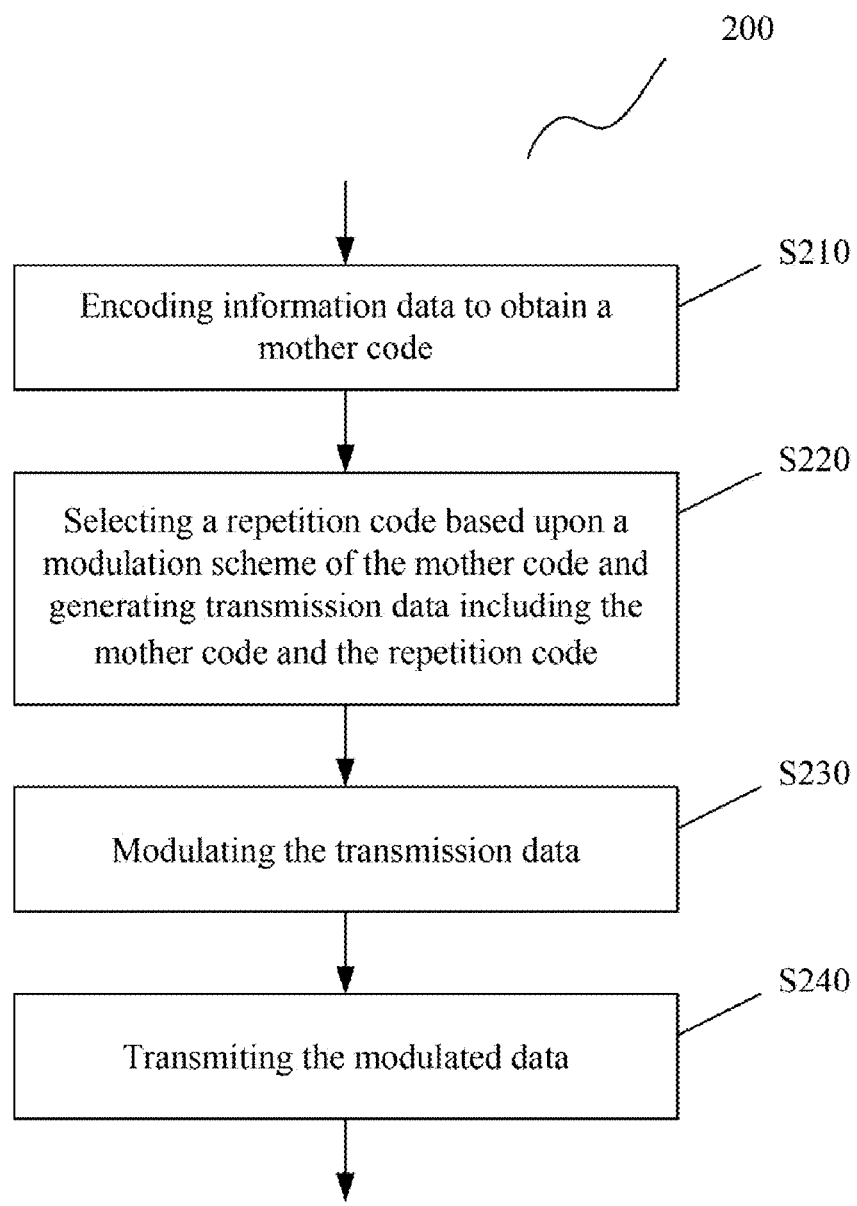
FIG. 2 illustrates a flow chart of a data transmission method according to an embodiment of the invention.

FIG. 2 illustrates a flow chart of a data transmission method according to an embodiment of the invention. As illustrated in FIG. 2, firstly information data is encoded to obtain a mother code in the step S210 upon reception of the information data. Then a repetition code is selected based on a modulation scheme of the mother code and transmission data including the mother code and the repetition code is generated in the step S220. The repetition code is selected from a part of the mother code with low reliability based on the modulation scheme of the mother code. A specific approach of selecting a repetition code will be detailed below.

After the transmission data is generated in the step S220, the generated transmission data is modulated in the step S230 and the modulated data is transmitted in the step S240.

Figure 3:
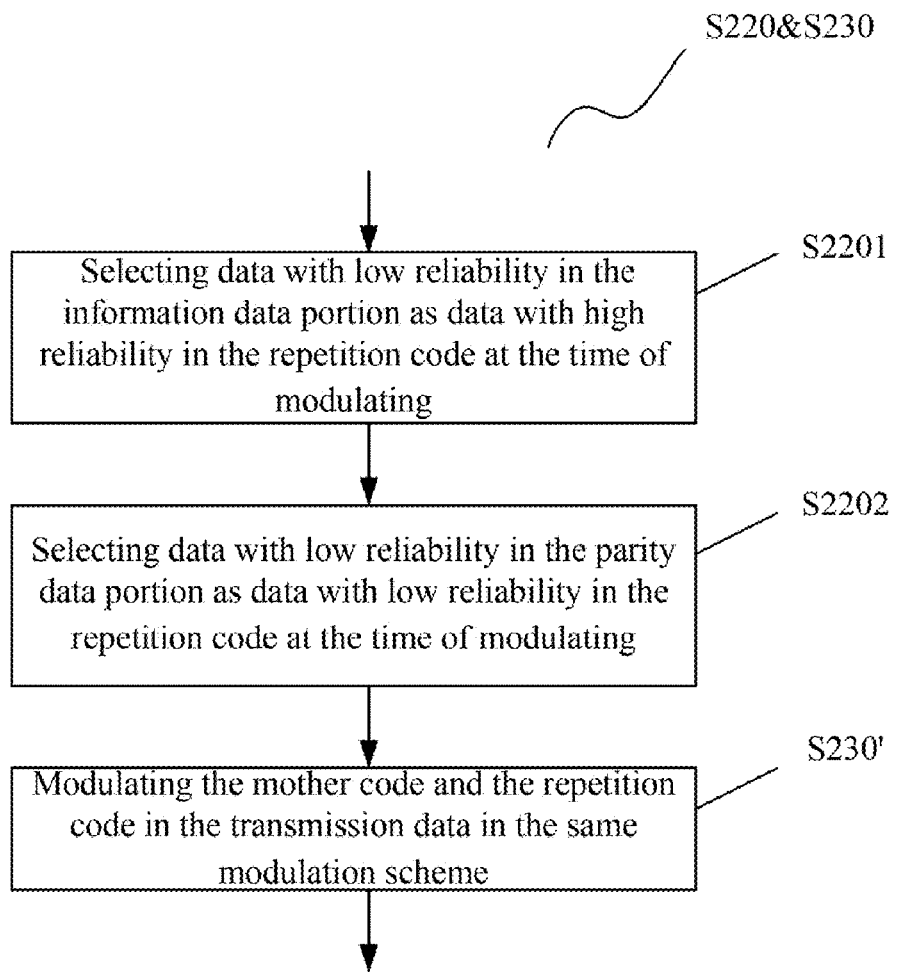
FIG. 3 illustrates a flow chart of generating and modulating transmission data according to a first embodiment of the invention.

FIG. 3 illustrates a flow chart of generating and modulating transmission data according to a first embodiment of the invention. As illustrated in FIG. 3, the step of selecting the data illustrated in FIG. 2 includes the steps S2201 and S2202. At the time of selecting the repetition code, data with low reliability in the information data portion is selected as data with high reliability in the repetition code at the time of modulating in the step S2201, and data with lower reliability in the parity data portion is selected as data with low reliability in the repetition code at the time of modulating in the step S2202. Then the mother code and the repetition code serve together as transmission data, and the mother code and the repetition code in the transmission data are modulated in the same modulation scheme in the step S230'.

In the embodiment of the invention, the modulation scheme is QPSK, 16QAM, 64QAM or a higher-order modulation scheme. However, the modulation scheme will not be limited thereto but can be any other bit reliability-variable modulation scheme.

Figure 5:
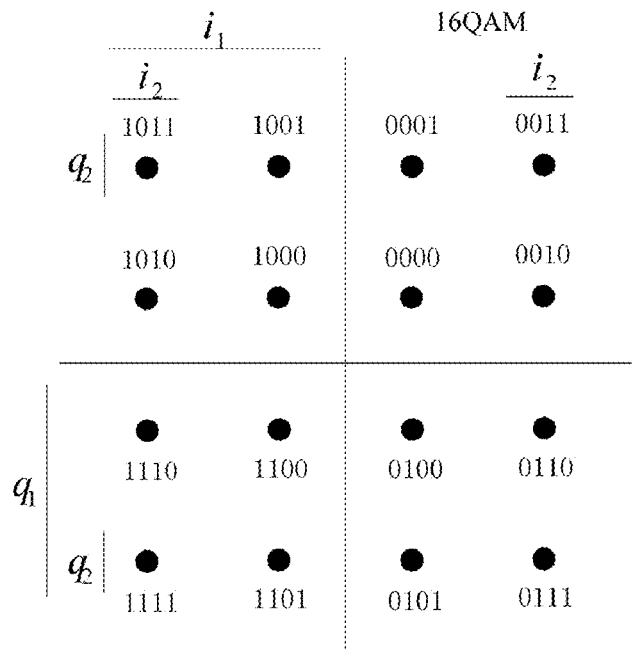
FIG. 5 illustrates a constellation diagram of hexadecimal Quadrature Amplitude Modulation (16QAM)

As well known, an inherent feature of multi-level modulation including Quadrature Amplitude Modulation (QAM) lies in that bit reliability depends upon a mapping relationship of a modulation constellation diagram and the reliabilities of bits mapped into the same modulation symbol are variable. That is, the reliabilities of bits in a modulation symbol vary with different bit positions in the case of high-order modulation (e.g., 16QAM, 64QAM or higher-order modulation). For example, in a 64QAM constellation diagram illustrated in FIG. 4, each 64QAM symbol includes 6 bits which are mapped into the sequence of $i_1 q_1 i_2 q_2 i_3 q_3$, where $i_1$ and $q_1$ are bits with highest reliability, $i_3$ and $q_3$ are bits with lowest reliability, and $i_2$ and $q_2$ are bits with intermediate reliability. In a 64QAM constellation diagram illustrated in FIG. 5, each 16QAM symbol includes 4 bits which are mapped into the sequence of $i_1 q_1 i_2 q_2$, where $i_1$ and $q_1$ are bits with high reliability, and $i_2$ and $q_2$ are bits with low reliability.

Therefore, data of those mother codes with low reliability at the time of modulating will preferentially be selected for a repetition code. For example, in an example of the first embodiment of the invention, if the 16QAM modulation scheme is used where each modulation symbol includes four bits, then at time of selecting the repetition code, the last two bits in the information data portion (i.e., the part with low reliability) can be selected as the data with high reliability in the repetition code at the time of modulating while selecting the last two bits in the parity data portion (i.e., the part with low reliability) as the data with low reliability in the repetition code at the time of modulating in correspondence to the 16QAM symbol. That is, the two bits $i_2$ and $q_2$ with low reliability in the 16QAM symbol of the information data portion are remapped into two bits with high reliability in the 16QAM constellation diagram, and the two bits $i_2$ and $q_2$ with low reliability in the 16QAM symbol of the parity data portion are remapped into two bits with low reliability in the 16QAM constellation diagram.

Figure 6:
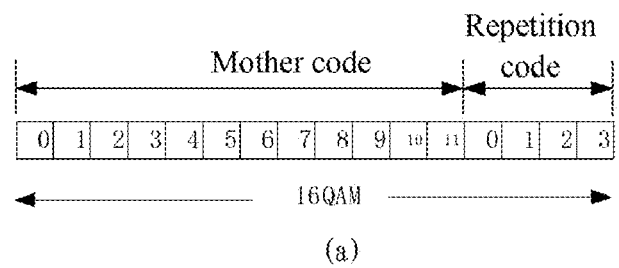
FIG. 6 illustrates a schematic diagram of comparing a structure of transmission data in the first embodiment of the invention with that in the prior art.
Figure 6:
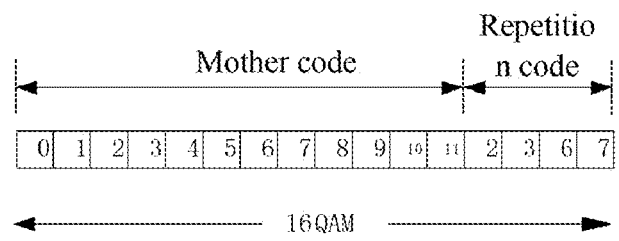

FIG. 6 illustrates a schematic diagram of comparing a structure of transmission data in the first embodiment of the invention with that in the prior art. As illustrated in FIG. 6, this example is an example of the case that a mother code and a repetition code are modulated respectively in the 16QAM modulation scheme. Particularly, FIG. 6(a) illustrates a structure of transmission data in the prior art in the case of repeating as illustrated in FIG. 1. In FIG. 6(a), the repetition data is the information data portion, that is, includes four bits of "0", "1", "2" and "3" in the information data. In correspondence to a 16QAM symbol, as can be apparent from the foregoing description of the mapping relationship of the 16QAM constellation diagram in FIG. 5, the first two bits of "0" and "1" in the information data are bits with high reliability and the last bits of "2" and "3" are bits with low reliability. Therefore, the structure of transmission data in the prior art includes both the bits with high reliability in the mother code and the bits with low reliability in the mother code. FIG. 6(b) illustrates a structure of transmission data in the first embodiment of the invention. In the structure of transmission data of FIG. 6(b), the repetition data is composed of the bits of "2" and "3" with low reliability in the information data and the bits of "6" and "7" with low reliability in the parity data 1 in correspondence to a 16QAM symbol. Of course, the repetition data can alternatively be composed of the "2" and "3" with low reliability in the information data and the bits of "10" and "11" with low reliability in the parity data 2. Therefore in the transmission data in this embodiment of the invention, the repetition code includes only a mother code with low reliability at the time of modulating.

Similarly in another example of the first embodiment of the invention, if the 64QAM modulation scheme is used where each modulation symbol includes six bits, then at time of selecting the repetition code, the last two bits in the information data portion (i.e., the part with lowest reliability) can be selected as the data with highest reliability in the repetition code at the time of modulating while selecting the last two bits in the parity data 1 (i.e., the part with lowest reliability) as the data with intermediate reliability in the repetition code at the time of modulating and selecting the last two bits in the parity data 2 (i.e., the part with lowest reliability) as the data with lowest reliability in the repetition code at the time of modulating in correspondence to the 64QAM symbol. Alternatively, four bits with low reliability in the information data portion can be selected as the first four bits with high reliability in the repetition code while selecting the last two bits in the parity data 1 or the parity data 2 as the data with lowest reliability in the repetition code at the time of modulating.

Of course, the first embodiment of the invention will not be limited thereto but can adopt any other appropriate approach of selecting, which can be adjusted dependent upon a different modulation scheme and requirement. A repeated description of an example of any other approach of selecting as well as any other modulation scheme and a corresponding approach of selecting thereof will be omitted here.

In the method according to the first embodiment of the invention, the part of the mother code with low reliability is selected as the part of the repetition code with high reliability to thereby improve the reliability and consequently the performance of a communication system.

Figure 7:
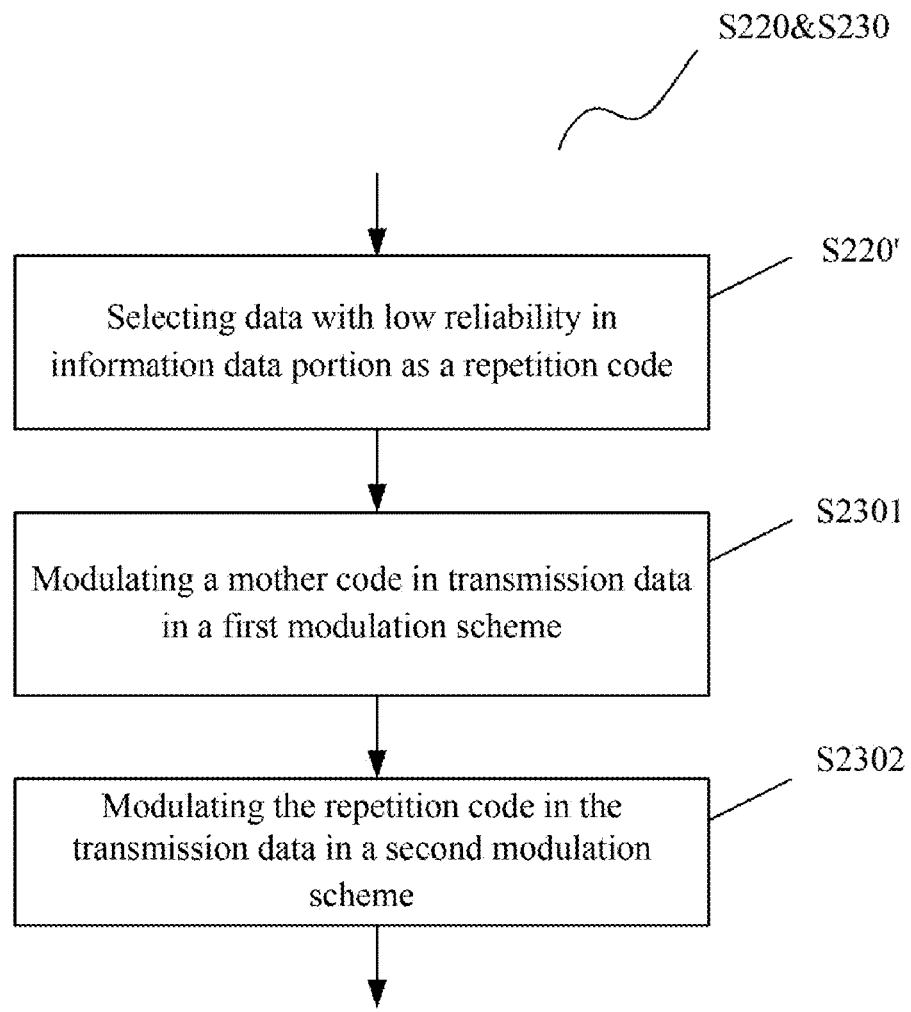
FIG. 7 illustrates a flow chart of generating and modulating transmission data according to a second embodiment of the invention.

FIG. 7 illustrates a flow chart of generating and modulating transmission data according to a second embodiment of the invention. Unlike the first embodiment of the invention, different modulation schemes are adopted for a mother code and a repetition code in the second embodiment of the invention. As illustrated in FIG. 7, data with low reliability in information data portion is selected as a repetition code at the time of selecting the repetition code in the step S220', a mother code in transmission data is modulated in a first modulation scheme in the step S2301, and the repetition code in the transmission data is modulated in a second modulation scheme in the step S2302, where the second modulation scheme is at a lower order than the first modulation scheme, and the repetition code includes at least a part or all of the data with low reliability in the information data portion.

For example, if the mother code is modulated in the 64QAM modulation scheme, then lower-order modulation can be performed on the repetition code in the 16QAM modulation scheme or the QPSK modulation scheme. If the mother code is modulated in the 16QAM modulation scheme, then four bits with low reliability in the mother code at the time of being mapped into a 64QAM symbol can be select as the repetition code. If lower-order modulation is performed on the repetition code in the QPSK modulation scheme, then two bits with low reliability in the mother code being mapped into a 64QAM symbol can be select as the repetition code. Preferably, when lower-order modulation is performed on the repetition code in the QPSK modulation scheme, two bits with lowest reliability in the mother code being mapped into a 64QAM symbol can be select as the repetition code to be modulated in the QPSK modulation scheme.

Figure 8:
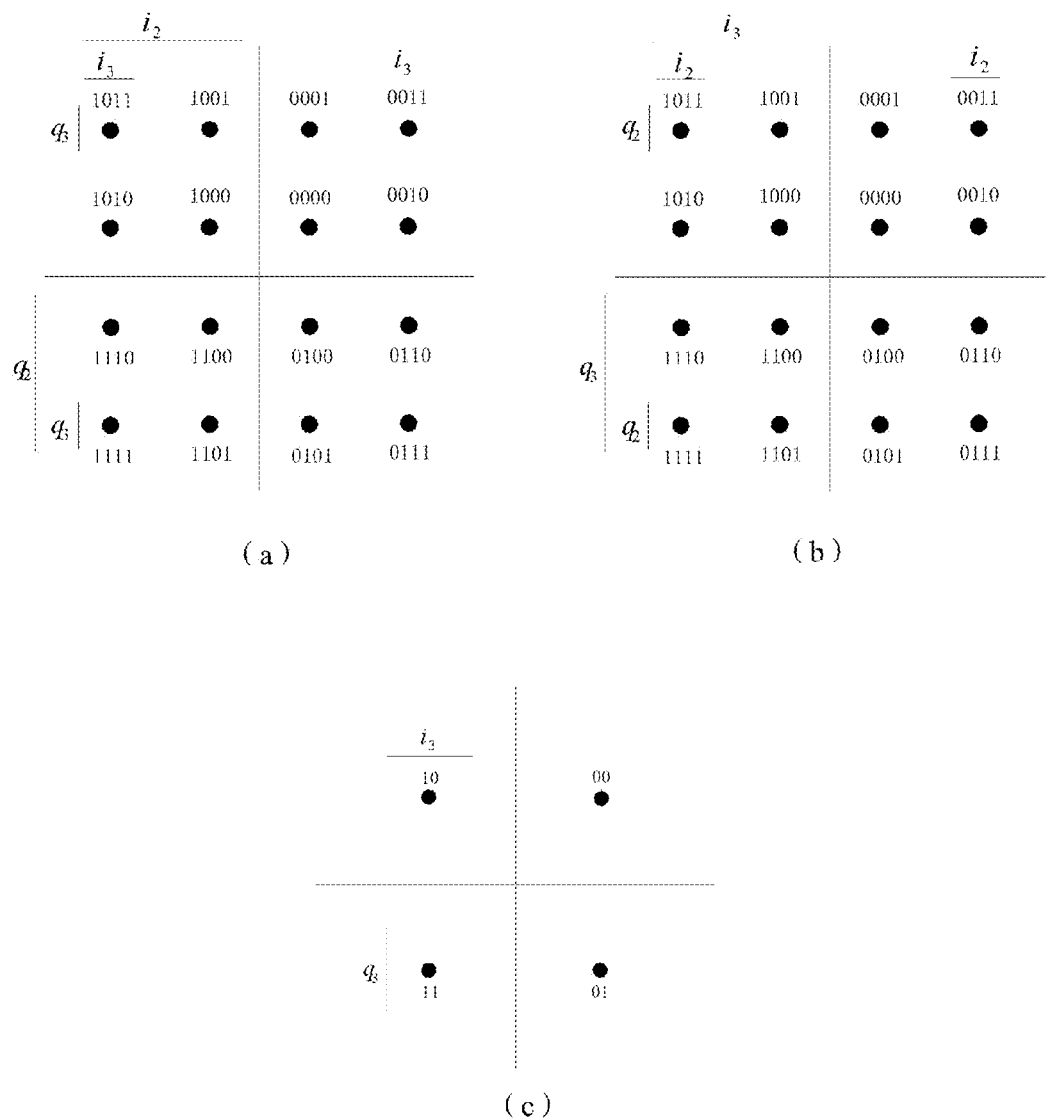
FIG. 8 illustrates examples of constellation diagrams of 16QAM and Quadrature Phase Shift Keying (QPSK) for modulating a repetition code when a mother code is encoded in 64QAM in a data transmission method according to the second embodiment of the invention.

FIG. 8 illustrates examples of constellation diagrams of 16QAM and QPSK for modulating the repetition code when the mother code is encoded in 64QAM in the data transmission method according to the second embodiment of the invention.

Figure 4:
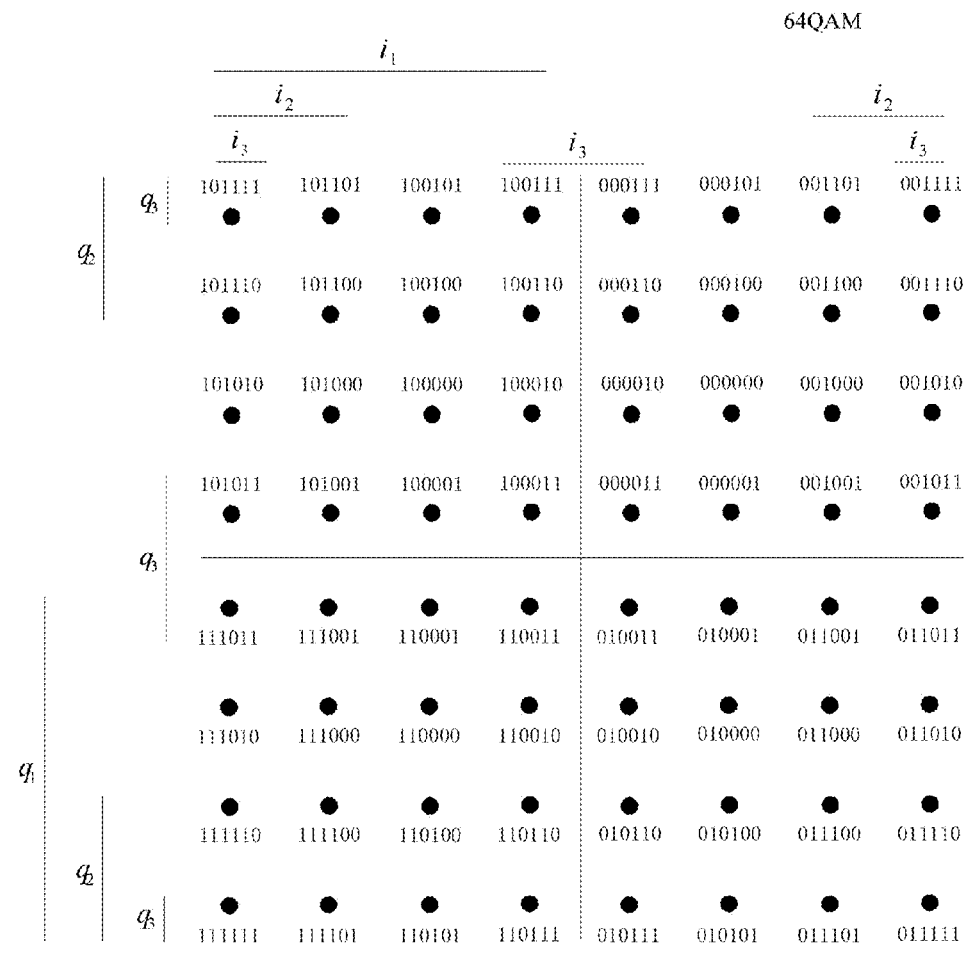

As illustrated in FIG. 8(a), the two bits $i_2$ and $q_2$ with intermediate reliability in the 64QAM symbol in the 64QAM constellation diagram illustrated in FIG. 4 can be mapped into two bits with high reliability in the 16QAM constellation diagram respectively while mapping the two bits $i_3$ and $q_3$ with lowest reliability in the 64QAM symbol into two bits with low reliability in the 16QAM constellation diagram respectively, thus resulting in a 16QAM constellation diagram for modulating the repetition code (with a bit mapping relationship of $i_2q_2i_3q_3$).

Of course, alternatively the two bits $i_3$ and $q_3$ with lowest reliability in the 64QAM symbol can be mapped into two bits with high reliability in the 16QAM constellation diagram respectively while mapping the two bits $i_2$ and $q_2$ with intermediate reliability in the 64QAM symbol into two bits with low reliability in the 16QAM constellation diagram respectively, thus resulting in a 16QAM constellation diagram for modulating the repetition code (with a bit mapping relationship of $i_3q_3i_2q_2$) as illustrated in FIG. 8(b).

Alternatively, the two bits $i_3$ and $q_3$ with lowest reliability in the 64QAM symbol can be mapped into two bits in a QPSK constellation diagram respectively, thus resulting in a QPSK constellation diagram for modulating the repetition code (with a bit mapping relationship of $i_3q_3$) as illustrated in FIG. 8(c).

In another example of modulating the mother code in the 16QAM modulation scheme, lower-order modulation can be performed on the repetition code in the QPSK modulation scheme. In this case, two bits with low reliability in the mother code being mapped into the 16QAM can be selected as the repetition code.

Figure 9:
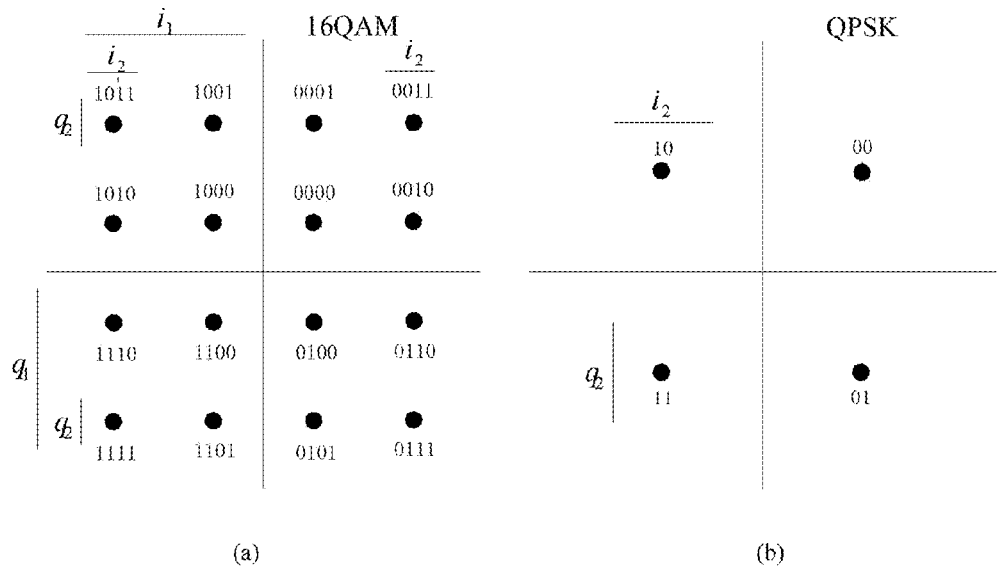
FIG. 9 illustrates examples of a constellation diagram of 16QAM when a mother code is encoded in 16QAM and of a constellation diagram of QPSK for modulating a repetition code in a data transmission method according to the second embodiment of the invention.

FIG. 9 illustrates examples of a constellation diagram of 16QAM when the mother code is encoded in 16QAM and of a constellation diagram of QPSK for modulating the repetition code in the data transmission method according to the second embodiment of the invention. As illustrated in FIG. 9, two bits $i_2$ and $q_2$ with low reliability in a 16QAM symbol in a 16QAM constellation diagram illustrated in FIG. 9(a) can be mapped into two bits in a QPSK constellation diagram respectively, thus resulting in a QPSK constellation diagram for modulating the repetition code as illustrated in FIG. 9(b) (with a bit mapping relationship of $i_2q_2$).

Figure 10:
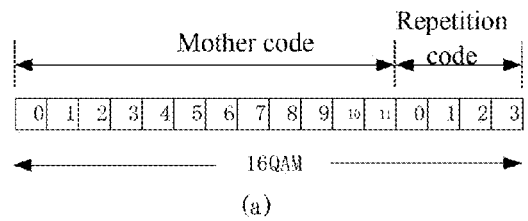
FIG. 10 illustrates a schematic diagram of comparing a structure of transmission data in the second embodiment of the invention with that in the prior art.
Figure 10:
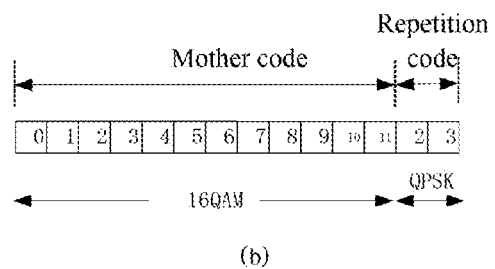

FIG. 10 illustrates a schematic diagram of comparing a structure of transmission data in the second embodiment of the invention with that in the prior art. As illustrated in FIG. 10, this example is an example of the case that the mother code is modulated in the 16QAM modulation scheme and lower-order modulation is performed on the repetition code in the QPSK modulation scheme. Particularly, FIG. 10(a) illustrates the structure of transmission data in the prior art in the case of repeating as illustrated in FIG. 1, and the structure of transmission data has been detailed with reference to FIG. 6(a), so a repeated description thereof will be omitted here. As can be apparent from FIG. 10(a), the structure of transmission data in the prior art includes both the bits with high reliability in the data of the mother code and the bits with lower reliability in the data of the mother code. FIG. 10(b) illustrates a structure of transmission data in the second embodiment of the invention. In the structure of transmission data of FIG. 10(b), the repetition code is composed of the two bits of "2" and "3" with low reliability of the information data in the data of the mother code at the time of being mapped into a 16QAM symbol. Therefore, the structure of transmission data in the second embodiment of the invention also includes only the data with low reliability in the mother code at the time of modulating.

Further, in the method according to the second embodiment of the invention, the part of the mother code with low reliability is selected as the repetition code to thereby improve the reliability and consequently the performance of a communication system.

Furthermore, in the method according to the second embodiment of the invention, the repetition code is modulated in lower-order modulation to thereby lower the complexity of a part of demodulation at a receiver.

Figure 11:
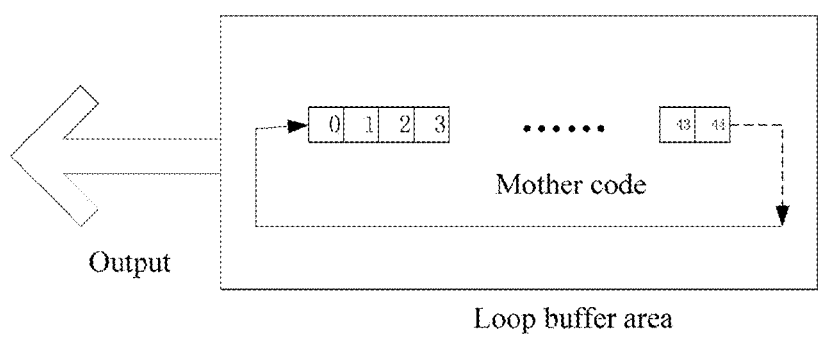
FIG. 11 illustrates a schematic diagram of an encoding and outputting module based upon cyclic buffering.

A specific application example of the data transmission method according to the foregoing embodiments will be given blow. In this example, Convolution Turbo Code (CTC) encoding is used, a required code rate is 1/4 and the 16QAM modulation scheme is selected to modulate a code block. An encoding module has 15-byte data input thereto and outputs a 45-byte CTC mother code (i.e., at a code rate of 1/3). Therefore, the data is cycled into 60-byte output data to satisfy the required code rate. FIG. 11 illustrates a schematic diagram of the encoding module based upon cyclic buffering. The first 45 bytes of data in the 60-byte encoded output data is data of a complete mother code and the last 15 bytes of data in the 60-byte encoded output data is a repetition of the first 15 bytes of data in the mother code. The 16QAM modulation scheme is adopted for the first 45 bytes of data in the 60-byte encoded output data. For the last 15 bytes, two bits with low reliability are taken and modulated in the QPSK modulation scheme in correspondence to each 16QAM modulation symbol, and then the modulated data is transmitted out.

Furthermore, if the 64QAM modulation scheme is pre-selected for a code block, then the repeated part is modulated in a lower-order modulation scheme than 64QAM, e.g., 16QAM or QPSK, and a symbol subject to lower-order modulation will not include a bit with high reliability in a 64QAM modulation symbol any longer. If a higher-order modulation scheme is pre-selected for a code block, then the repeated part can be modulated similarly thereto, and a repeated description thereof will be omitted here.

Although a specific application of the data transmission method according to the foregoing embodiments has been described here with reference to FIG. 10 taking the CTC encoding scheme as an example, the principle of the invention apparently will not be limited thereto, and those skilled in the art can select code rates for encoding dependent upon a practical situation and determine an appropriate modulation scheme for modulating a bit with low reliability in the repeated part so as to make the reliability of respective bits resulting from merging at the receiver as uniform as possible.

Figure 12:
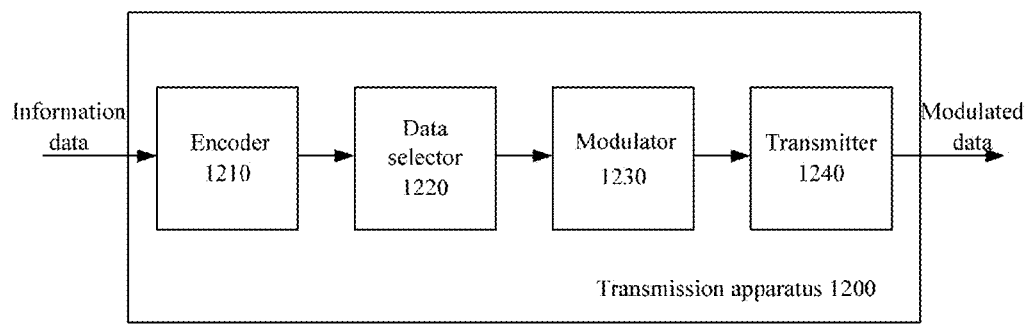
FIG. 12 illustrates a schematic block diagram of a data transmission apparatus according to an embodiment of the invention.

FIG. 12 illustrates a schematic block diagram of a data transmission apparatus according to an embodiment of the invention. The data transmission apparatus 1200 can perform the data transmission method described above with reference to the drawings to encode, modulate and transmit information data.

As illustrated in FIG. 12, the data transmission apparatus 1200 according to this embodiment includes: an encoder 1210 configured to encode information data to obtain a mother code; a data selector 1220 configured to generate transmission data including the mother code and a repetition code based upon the mother code obtained from encoding by the encoder 1210, wherein the repetition code is selected from a part of the mother code with low reliability based on a modulation scheme of the mother code; a modulator 1230 configured to modulate the transmission data; and a transmitter 1240 configured to transmit the data modulated by the modulator 1230.

How to perform the functions of the respective components of the data transmission apparatus 1200 will become apparent from examination of the specific operation process of the data transmission method described above. Indeed, specific processes in the encoder 1210, the data selector 1220, the modulator 1230 and the transmitter 1240 in the data transmission apparatus 1200 illustrated in FIG. 12 are similar respectively to those in the encoding step (S1210), the data selection step (S220, S2201, S2202, S220'), the modulation step (S230, S230', S2301, S2302) and the transmission step (S240) described with reference to FIG. 2 to FIG. 10, and therefore a repeated description in details of how to perform the functions of the respective components will be omitted here for conciseness of the description.

Figure 13:
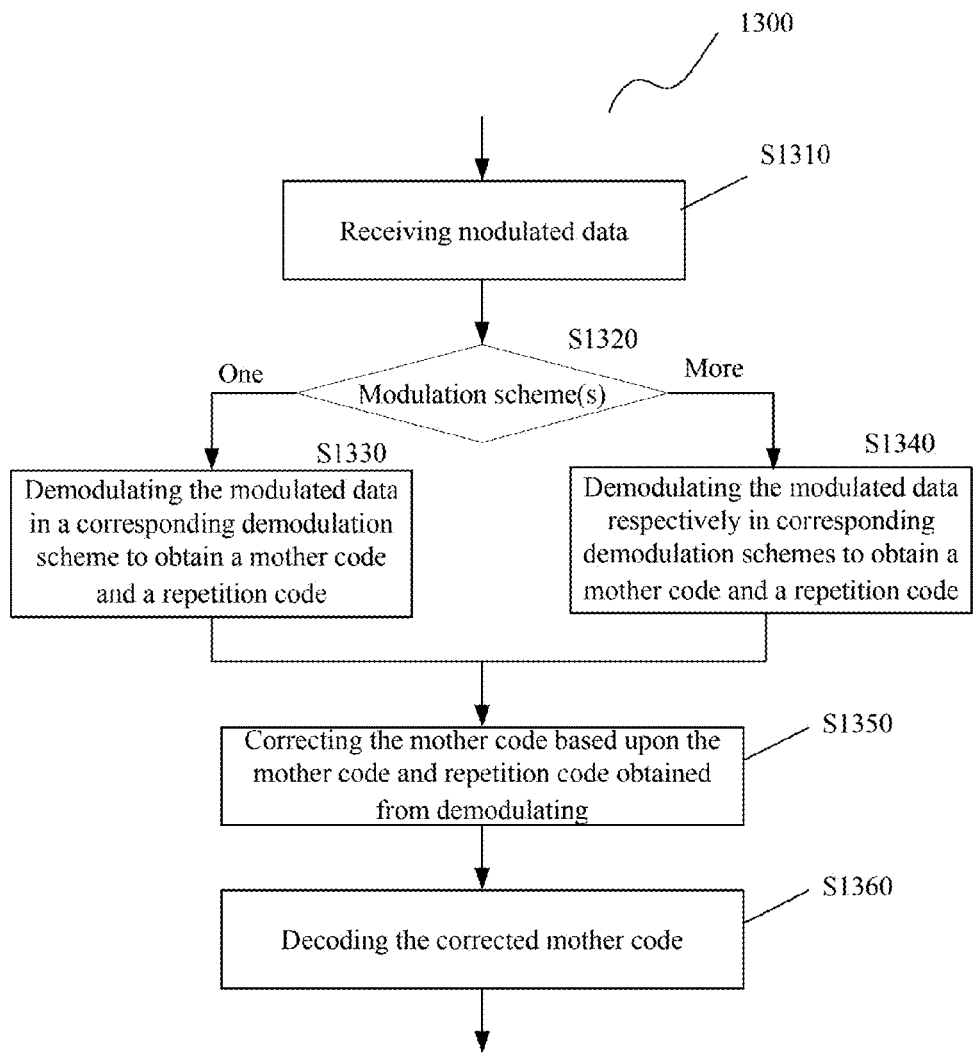
FIG. 13 illustrates a flow chart of a data reception method according to an embodiment of the invention.

An example of a data reception method corresponding to the data transmission method according to the embodiments of the invention will be given below. FIG. 13 illustrates a flow chart of a data reception method according to an embodiment of the invention. As illustrated in FIG. 13, firstly modulated data is received in the step S1310, and a modulation scheme of the received modulated data is determined in the step S1320. As can be apparent from the foregoing description of the data transmission method according to the embodiments of the invention, the modulated data includes a mother code and a repetition code, where the repetition code is a part of the mother code with low reliability that is selected based on the modulation scheme of the mother code. If it is determined in the step S1320 that the modulated data is modulated in one modulation scheme, then the modulation data is demodulated in a demodulation scheme corresponding to the modulation scheme in the step S1330 to obtain into the mother code and the repetition code.

On the other hand, if it is determined in the step S1320 that the modulated data is modulated in more than a plurality of modulation schemes, then the modulation data is demodulated respectively in a plurality of demodulation schemes corresponding to the modulation schemes to obtain the mother code and the repetition code in the step S1340.

After obtaining the mother code and the repetition code, the mother code is corrected based upon the mother code and repetition code obtained from demodulating in the step S1350 and the corrected mother code is decoded in the step S1360.

As with the data transmission method and/or apparatus described above, in the case that modulation schemes of the mother code and the repetition code in the received modulated data are the same, that is, it is determined in the step S1320 that the modulated data is modulated in one modulation scheme, the mother code includes an information data portion and a parity data portion, and the repetition code shall include at least a part or all of data with low reliability in the information data portion. In this case, data with high reliability in the repetition code is preferably from the data with low reliability of the information data portion while selecting data with low reliability in the repetition code from data with low reliability in the parity data portion.

Furthermore in the case that modulation schemes of the mother code and the repetition code in the received modulated data are different, that is, it is determined in the step S1320 that the modulated data is modulated in a plurality of modulation schemes, the mother code in the received modulated data is typically modulated in a first modulation scheme while demodulating the repetition code in the received modulated data in a lower-order second modulation scheme than the first modulation scheme. At this time, the mother code includes an information data portion and a parity data portion, and the repetition code shall include at least a part or all of data with low reliability in the information data portion.

Figure 14:
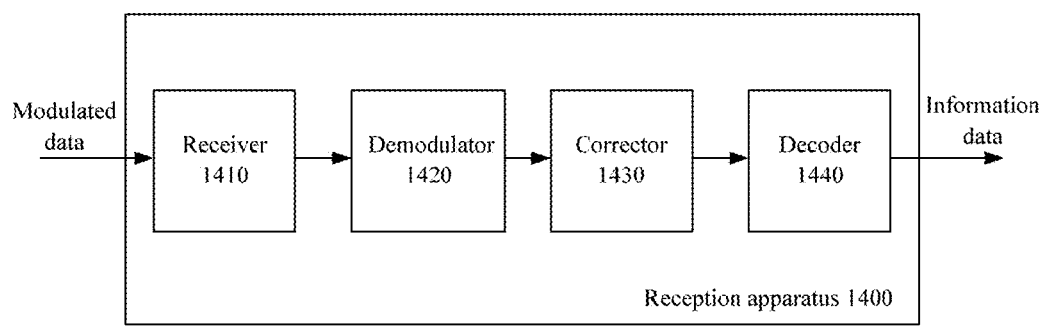
FIG. 14 illustrates a schematic block diagram of a data reception apparatus according to an embodiment of the invention.

FIG. 14 illustrates a schematic block diagram of a data reception apparatus according to an embodiment of the invention. The data reception apparatus 1400 can perform the data reception method described above with reference to the drawings to receive, correct, demodulate and decode information data and can be used in cooperation with the data transmission apparatus according to the embodiment of the invention.

As illustrated in FIG. 14, the data reception apparatus 1400 includes: a receiver 1410 configured to receive modulated data; a modulator 1420 configured to demodulate the modulated data received by the receiver 1410 to generate a mother code and a repetition code, wherein the repetition code is a part of the mother code with low reliability that is selected based on a modulation scheme of the mother code; a corrector 1430 configured to correct the mother code based on the mother code and repetition code obtained from demodulating by the demodulator 1420; and a decoder 1440 configured to decode the mother code corrected by the corrector 1430.

Alike, how to perform the functions of the respective components of the data reception apparatus 1400 will become apparent from examination of the operation process of the data reception method described above. Indeed, specific processes in the receiver 1410, the demodulator 1420, the corrector 1430 and the decoder 1440 in the data reception apparatus 1400 illustrated in FIG. 14 are similar respectively to those in the reception step (S1310), the demodulation step (S1320, S1330, S1340), the correction step (S1350) and the decoding step (S1360) described with reference to FIG. 13, and therefore a repeated description in details of how to perform the functions of the respective components will be omitted here for conciseness of the description.

In the data transmission method and/or apparatus and the data reception method and/or apparatus according to the embodiments of the invention described above, the part in the mother code with low reliability is selected as the repetition code to generate the transmission data including the mother code and the repetition code, the mother code and the repetition code in the transmission data is modulated in an appropriate modulation scheme, and then the modulated transmission data is transmitted out, thus lowering the complexity of demodulation at a receiver while improving the performance of a communication system.

Although the preferred embodiments of the invention have been illustrated and described, it can be envisioned that those skilled in the art can devise various modifications to the invention without departing from the spirit and scope of the appended claims.

Furthermore, the respective operation process of the methods according to the invention apparently can also be embodied in computer executable program stored in various machine readable storage mediums.

Moreover, the object of the invention can also be attained in such a way that the storage mediums in which codes of the executable program are stored is provided directly or indirectly to a system or a device and the program codes are read and executed by a computer or a Central Processing Unit (CPU) in the system or the device.

In this regard, the embodiments of the invention will not be limited to the program so long as the system or the device is capable of executing the program, and the program can be in any form of, e.g., object program, program executed by an interpreter, script program provided to an operating system, etc.

The storage mediums can include but will not be limited to various memories and memory cells, a semiconductor device, a magnetic disk, e.g., an optical, magnetic or magnetic-optic disk and other mediums suitable for storing information, etc.

Furthermore, the invention can also be embodied by connecting a computer to a corresponding website over the Internet, downloading and installing the codes of the computer program according to the invention into the computer and then executing the program.

Furthermore, the program in which the invention is embodied can also be in a form of one or more signals, which can be a data signal downloaded from a website over the Internet, a data signal provided over a carrier signal or data signal in any other form.

Lastly, it shall be noted that relationship terms in this specification such as the left and right, the first, the second, etc., are merely intended to distinguish one entity or operation from another but may not necessarily require or suggest presence of any such a practical relationship or order between these entities or operations. Moreover, terms "comprise", "include", "contain" or any other variations thereof are intended to encompass non-exclusive inclusion, so that a process, method, article, or device that comprises a list of elements includes not only these elements but also other elements which have not been explicitly listed or inherent to such a process, method, article, or device. Unless further defined, a sentence "comprising a/an . . . " which defines an element does not preclude presence of the same additional element(s) in the process, method, article, or device that comprises the element.

Although the embodiments of the invention have been detailed above with reference to the drawings, it shall be appreciated that the embodiments described above are intended to merely illustrate but not limit the invention. Those skilled in the art can make various modifications and variations to the embodiments without departing from the spirit and scope of the invention. Accordingly, the scope of the invention is defined merely by the appended claims and their equivalences.

The invention claimed is:

1. A data transmission method, comprising:
    encoding information data to obtain a mother code;
    generating transmission data comprising the mother code and a repetition code, wherein the repetition code is selected from a part of the mother code having low reliability based on a modulation scheme of the mother code;
    modulating the transmission data; and
    transmitting the modulated data;
    wherein:
        the mother code comprises an information data portion and a parity data portion;
        the repetition code comprises at least a part of or all of data having low reliability in the information data portion; and
        the mother code and the repetition code are modulated respectively by using a same modulation scheme.

2. The data transmission method according to claim 1, wherein
    data having low reliability in the information data portion is selected as data having high reliability in the repetition code at the time of modulating; and
    data having low reliability in the parity data portion is selected as data having low reliability in the repetition code at the time of modulating.

3. A data transmission method comprising:
    encoding information data to obtain a mother code;
    generating transmission data comprising the mother code and a repetition code, wherein the repetition code is selected from a part of the mother code having low reliability based on a modulation scheme of the mother code;
    modulating the transmission data; and
    transmitting the modulated data;
    wherein:
        the mother code comprises an information data portion and a parity data portion;
        the repetition code comprises at least a part of or all of data having low reliability in the information data portion; and
        the mother code in the transmission data is modulated by using a first modulating scheme, and the repetition code in the transmission data is modulated by using a second modulating scheme with an order lower than the order of the first modulating scheme.

4. The data transmission method according to claim 3, wherein
    the first modulation scheme is 16QAM or 64QAM and the second modulation scheme is QPSK; and
    two bits having low reliability of the mother code mapped into a 16QAM symbol or a 64QAM symbol are selected as the repetition code.

5. The data transmission method according to claim 3, wherein
    the first modulation scheme is 64QAM and the second modulation scheme is 16QAM; and
    four bits having low reliability of the mother code mapped into a 64QAM symbol are selected as the repetition code.

6. The data transmission method according to claim 5, wherein among the four bits selected, two bits having the lowest reliability are mapped into positions having high reliability in the 16QAM symbol, and two bits having lower reliability are mapped into positions having low reliability in the 16QAM symbol.

7. A data transmission apparatus, comprising:
an encoder configured to encode information data to obtain a mother code;
a data selector configured to generate transmission data comprising the mother code and a repetition code, wherein the repetition code is selected from a part of the mother code having low reliability based on a modulation scheme of the mother code;
a modulator configured to modulating the transmission data; and
a transmitter configured to transmit the modulated data; wherein:
the mother code comprises an information data portion and a parity data portion;
the repetition code comprises at least a part of or all of data having low reliability in the information data portion; and
the modulator modulates the mother code and the repetition code respectively by using a same modulation scheme.

8. The data transmission apparatus according to claim 7, wherein the data selector selects data having low reliability in the information data portion as data having high reliability in the repetition code at the time of modulating and selects the data having low reliability in the parity data portion as data having low reliability in the repetition code at the time of modulating.

9. A data transmission apparatus comprising:
an encoder configured to encode information data to obtain a mother code;
a data selector configured to generate transmission data comprising the mother code and a repetition code, wherein the repetition code is selected from a part of the mother code having low reliability based on a modulation scheme of the mother code;
a modulator configured to modulating the transmission data; and
a transmitter configured to transmit the modulated data; wherein:
the mother code comprises an information data portion and a parity data portion;
the repetition code comprises at least a part of or all of data having low reliability in the information data portion; and
the modulator modulates the mother code in the transmission data by using a first modulating scheme and modulates the repetition code in the transmission data by using a second modulating scheme with an order lower than the order of the first modulating scheme.

10. The data transmission apparatus according to claim 9, wherein
the first modulation scheme is 16QAM or 64QAM and the second modulation scheme is QPSK; and
the data selector selects two bits having low reliability of the mother code mapped into a 16QAM symbol or a 64QAM symbol as the repetition code.

11. The data transmission apparatus according to claim 9, wherein
the first modulating scheme is 64QAM and the second modulation scheme is 16QAM; and
the data selector selects four bits having low reliability of the mother code mapped into a 64QAM symbol as the repetition code.

12. The data transmission apparatus according to claim 11, wherein among the four bits selected, two bits having the lowest reliability are mapped into positions having high reliability in the 16QAM symbol, and two bits having lower reliability are mapped into positions having low reliability in the 16QAM symbol.

13. A data reception method, comprising:
receiving modulated data;
demodulating the modulated data respectively to generate a mother code and a repetition code, wherein the repetition code is a part of the mother code having low reliability that is selected based on a modulation scheme of the mother code;
correcting the mother code based on the demodulated mother code and repetition code; and
decoding the corrected mother code;
wherein:
modulation schemes of the mother code and the repetition code in the modulated data received are the same;
the mother code comprises an information data portion and a parity data portion; and
the repetition code comprises at least a part of or all of data having low reliability in the information data portion.

14. The data reception method according to claim 13, wherein
data having high reliability in the repetition code are selected from data having low reliability in the information data portion; and
data having low reliability in the repetition code are selected from data having low reliability in the parity data portion.

15. A data reception method comprising:
receiving modulated data;
demodulating the modulated data to generate a mother code and a repetition code, wherein the repetition code is a part of the mother code having low reliability that is selected based on a modulation scheme of the mother code;
correcting the mother code based on the demodulated mother code and repetition code; and
decoding the corrected mother code;
wherein:
the mother code in the modulated data received is modulated by using a first modulating scheme, and the repetition code in the modulated data received is modulated by using a second modulating scheme with an order lower than the order of the first modulating scheme;
the mother code comprises an information data portion and a parity data portion; and
the repetition code comprises at least a part of or all of data having low reliability in the information data portion.

16. A data reception apparatus, comprising:
a receiver configured to receive modulated data;
a modulator configured to demodulate the modulated data respectively to generate a mother code and a repetition code, wherein the repetition code is a part of the mother code having low reliability that is selected based on a modulation scheme of the mother code;
a corrector configured to correct the mother code based on the demodulated mother code and repetition code; and
a decoder configured to decode the corrected mother code;
wherein:
modulation schemes of the mother code and the repetition code in the modulated data received are the same;

the mother code comprises an information data portion and a parity data portion; and the repetition code comprises at least a part of or all of data having low reliability in the information data portion.

17. The data reception apparatus according to claim 16, wherein data having high reliability in the repetition code are selected from data having low reliability in the information data portion; and data having low reliability in the repetition code are selected from data having low reliability in the parity data portion.

18. A data reception apparatus comprising:

a receiver configured to receive modulated data;

a modulator configured to demodulate the modulated data to generate a mother code and a repetition code, wherein the repetition code is a part of the mother code having low reliability that is selected based on a modulation scheme of the mother code;

a corrector configured to correct the mother code based on the demodulated mother code and repetition code; and a decoder configured to decode the corrected mother code;

wherein:

the mother code in the modulated data received is modulated by using a first modulating scheme, and the repetition code in the modulated data received is modulated by using a second modulating scheme with an order lower than the order of the first modulating scheme;

the mother code comprises an information data portion and a parity data portion; and the repetition code comprises at least a part of or all of data having low reliability in the information data portion.

* * * * *